United States Patent [19]

Ahmadi et al.

[11] Patent Number: 5,613,198
[45] Date of Patent: Mar. 18, 1997

[54] MULTIACCESS SCHEME FOR MOBILE INTEGRATED LOCAL AREA NETWORKS

[75] Inventors: Hamid Ahmadi, Somers; Amotz Bar-Noy; Ilan Kessler, both of Bronx; Arvind Krishna, Briarcliff Manor, all of N.Y.

[73] Assignee: International Business Machines Corporation, Armonk, N.Y.

[21] Appl. No.: 402,767

[22] Filed: Mar. 13, 1995

Related U.S. Application Data

[63] Continuation of Ser. No. 56,165, Apr. 30, 1993, abandoned.

[51] Int. Cl.$^6$ ................................................. H04Q 7/36
[52] U.S. Cl. ............... 455/33.1; 455/34.1; 455/56.1; 455/62; 455/63
[58] Field of Search ............... 455/62, 63, 56.1, 455/33.1, 34.1, 34.2, 50.1, 54.1, 33.3, 33.4; 379/59, 60; 370/95.1, 95.3

[56] References Cited

U.S. PATENT DOCUMENTS

| | | | |
|---|---|---|---|
| Re. 28,577 | 10/1975 | Schmidt | 455/34.2 |
| 3,632,885 | 1/1972 | Heroup | 455/34.2 |
| 4,144,411 | 3/1979 | Frenkiel | 379/59 |
| 4,747,101 | 5/1988 | Akaiwa et al. | 455/34.2 |
| 4,949,395 | 8/1990 | Rydbeck | 370/95.3 |
| 4,972,506 | 11/1990 | Uddenfeldt | 370/95.1 |
| 5,029,165 | 7/1991 | Choi et al. | 370/95.1 |
| 5,093,925 | 3/1992 | Chanroo | 379/59 |
| 5,111,534 | 5/1992 | Benner | 455/33.2 |
| 5,123,029 | 6/1992 | Bantz et al. | 375/202 |
| 5,185,739 | 2/1993 | Spear | 379/59 |
| 5,210,753 | 5/1993 | Natarajan | 455/33.4 |
| 5,230,082 | 7/1993 | Ghisler et al. | 455/56.1 |
| 5,233,643 | 8/1993 | Naeini et al. | 370/95.1 |

FOREIGN PATENT DOCUMENTS 0309826  12/1990  Japan ........................... 455/34.1

OTHER PUBLICATIONS

"Reuse Partioning in Cellular Systems" Samuel Halpern, Bell Labs 421 EEE 1983.

*Primary Examiner*—Reinhard J. Eisenzopf
*Assistant Examiner*—Nguyen Vo
*Attorney, Agent, or Firm*—Douglas W. Cameron; Ronald L. Drumheller

[57] ABSTRACT

A method of dynamically allocating bandwidth of channels to cells in a communications cellular network according to user demand. Groups of cells are formed so as to minimize interference within each group, and a particular channel is assigned to each of the groups. The bandwidth of each channel then is dynamically allocated by time division to each of the cells in the assigned group according to user demand in each of the cells thereof.

4 Claims, 3 Drawing Sheets

MULTIACCESS SCHEME FOR MOBILE INTEGRATED LOCAL AREA NETWORKS

This is a continuation of application Ser. No. 08/056,165, filed Apr. 30, 1993, now abandoned.

TECHNICAL FIELD

This invention relates to a method and apparatus for dynamically allocating bandwidth to cells in a cellular network.

BACKGROUND OF THE INVENTION

Consider a wireless mobile local area network environment supporting many low power, portable, personal computers or communication devices. The portable personal computers are assumed to support a host of communication services with high data rate applications ranging from interactive data with voice capability to multimedia. The geographical area is divided into small cells for two major reasons. Firstly, the power limitations of mobile terminals dictate the maximum range of wireless communication. Secondly, smaller cells allow greater spatial reuse of the communication bandwidth than larger cells. Associated with each cell there is one base station and time-varying population of mobile stations. This structure, see FIG. 1, lends itself to a cellular architecture in which mobile and base stations communicate over a wireless channel. The base stations communicate amongst themselves via by some stationary high-speed backbone networks. As an example, consider the environment of an industrial campus consisting of several office buildings. The buildings are divided into cells and cells are connected via some backbone network such as a wired LAN. Portable terminals can operate both indoor and outdoor with limited range (e.g, 50 meters) and have wireless access to the base stations on the backbone network. Each wireless channel in the network is shared by many mobile stations. In addition, in areas where cells of different base stations overlap, the wireless channel is shared by two or more base stations. Thus, in order to enable reliable and efficient communications between the mobile stations and the fixed backbone network, a multiaccess protocol must be employed.

In general, any multiaccess scheme for cellular networks can be divided into the intercell tier and intracell tier. The intercell tier ensures that transmissions of users from different cells within each subnetwork (e.g, LAN, WAN) do not interfere with each other. This tier of the multiaccess scheme is essentially a coordination among the base stations. The intracell tier ensures that within each cell of the network, the transmissions of all users that are within the same cell do not interfere with each other. This tier of the multiaccess scheme is essentially a coordination among mobile users that are within the same cell.

A problem in such environments is as follows. A basic constraint in every wireless communication system is that the total available spectrum, which determines the communication capacity of the system, is given and fixed. For example, the FCC regulates the spectrum usage in the United States. The problem is how to allocate bandwidth for each cell and for each user on a demand-driven basis, such that (i) the aggregate throughput, and (ii) the available peak-rate per user, are both maximized.

The well-known solutions in the prior art fall into one of two categories. The first category is FDMA [3, 6], wherein two neighboring cells always get distinct frequency bands in which to communicate between the base stations and the mobile units. Reference [6] is hereby incorporated by reference. The limitation of this solution is that the communication bandwidth may be too small in order to get a sufficient number of distinct frequency bands. The second category is TDMA [3, 4, 6], wherein all cells share the same frequency band and the transceivers in two neighboring cells are never simultaneously active. The limitation of this solution is that every transceiver has to communicate at a prohibitively high rate for a short period of time, which causes coordination problems between neighboring cells. A desirable solution is one which avoids the above-mentioned limitations. References [1, 3, 5, 7] describe related work on intracell multiaccess schemes for wireless networks.

U.S. Pat. No. 5,185,739 to Spear discloses a method for efficiently utilizing frequency frames by sharing frames of a particular frequency among base stations. However, the allocation described in Spear is fixed and not demand driven.

U.S. patent application, Ser. No. 785,643, corresponding to IBM Docket No. YO991-148, filed on Oct. 31, 1991 by the assignee of the current application, allowed Nov. 3, 1992, issuing into U.S. Pat. No. 5,210,753 on May 11, 1993, discloses the determination of a maximum set of independent cells which are initially activated while other cells not in this independent set are placed in a waiting state.

U.S. patent application Ser. No. 07/850,541, corresponding to IBM Docket No. YO991-117, filed on Mar. 13, 1992 by the assignee of the current application discloses a method of determining controlling base stations in overlapping cells.

U.S. Pat. No. 4,144,411 to Frenkiel discloses a method of allocating frequency channels in cellular network with cells of varying sizes.

U.S. Pat. No. 5,093,925 to Chanroo discloses the assignment of frequencies for telephone connections in a three dimensional layout to minimize co-channel interference.

U.S. Pat. No. 3,632,885 to Herold discloses how a ground station can transmit data on a channel associated with another ground station when that ground station is not transmitting on its own channel.

U.S. Pat. No. 4,949,395 to Rydbeck discloses a method of dynamically allocating time slots at the intracell level, and not at the intercell level.

U.S. Pat. No. 5,029,165 to Choi et al discloses the notion of clusters of signal links associated with a common channel type transfer point in a common channel signalling system.

Japanese patent application 63-298775 to Atsushi Murase discloses a multiple radio zone mobile communication system wherein a service area is covered simultaneously by a number of small radio zones and a large radio zone with each zone having its own base station.

SUMMARY OF THE INVENTION

The subject invention is a two-tier multi-access protocol. In the first tier, the cells are grouped into groups of cells, hereafter referred to as super-cells. The first tier also deals with the problem of bandwidth allocation and multiple access amongst super-cells. The second tier deals with dynamic bandwidth allocation and scheduling amongst mobile users and cells within a super-cell. The proposed scheduling for this tier can be used with either RF or IR as an underlying physical layer technology. This scheme is suitable for implementation either with RF directly or with RF on top of spread spectrum modulation scheme.

Accordingly, this invention provides a method and apparatus for allocating communication bandwidth to cells in a cellular network. This invention comprises: first, forming groups of cells to minimize interference between cells, second, assigning a corresponding channel of the communication bandwidth to each of the groups formed, and finally, allocating bandwidth within each of the channels to cells of a corresponding group to which the channel is assigned, with the bandwidth of each channel being allocated according to user demand in cells of a corresponding group.

The bandwidth allocated to each mobile unit and base station is demand driven. This is necessary for support of mobile stations with high peak rates (megabits/sec) or bursty traffic profiles such as those from diskless workstations, client-server model, multimedia and graphic applications which require sustained high throughput for a long period of time. Furthermore, variation in the population density of each cell requires adaptive allocation in order to achieve an efficient use of bandwidth.

Within each cell, base station schedules both the Uplink (from mobiles to base station) and Downlink (from base station to mobiles) channels in a dynamic manner and insures that they are separate. This separation is necessary for the operation of the scheduling algorithm as well as for the interference-free operation of the radio transmitters and receivers.

Control and Data channels are separated on both uplink and downlink channels. This separation is done in time, so that the amount of bandwidth allocated to each portion can be adaptively adjusted. Furthermore, the burden of complex control tasks is placed more on the base stations rather than on the mobile stations. This is important since the mobile stations have limited power capability.

Fast access and fairness: This implies that the mobile stations have a fast access capability whenever they need to transmit. At the same time the allocation is fair in the sense that no base station gets much more allocation than any other base station in any window of time.

Within each super-cell, intercell bandwidth allocation is done via a TDMA scheduling scheme with spatial reuse. That is, non-overlapping cells are scheduled over the same time frames to achieve higher bandwidth efficiency. Also, cells with a higher population and traffic demands can get more bandwidth than cells with less traffic. Base stations that need to communicate with many mobile users will get larger allocation of the control channel than base stations that need to communicate with fewer mobile users. Furthermore, for each base station the proportion of the allocation of control channel to the allocation of data channel may change in time according to needs.

Intracell bandwidth allocation is a combination of reservation based TDMA and random access.

The motivation behind the two-tier approach is due to either technological, economic or regulatory constraints. For example, if the aggregate feasible throughput of a base station is limited to 10 Mbps, but, the total allowable bandwidth is greater, then it is more efficient to partition the total bandwidth in 10 Mbps portions. This way, each 10 Mbps portion can then be allocated in the secondtier in a flexible and dynamic manner. In particular, if the total bandwidth is much larger than 10 Mbps, each super cell may consists of only one cell (in which case the scheme is a pure FDMA).

DESCRIPTION OF THE PREFERRED EMBODIMENT

Super-Cell Tier

Figure 1:
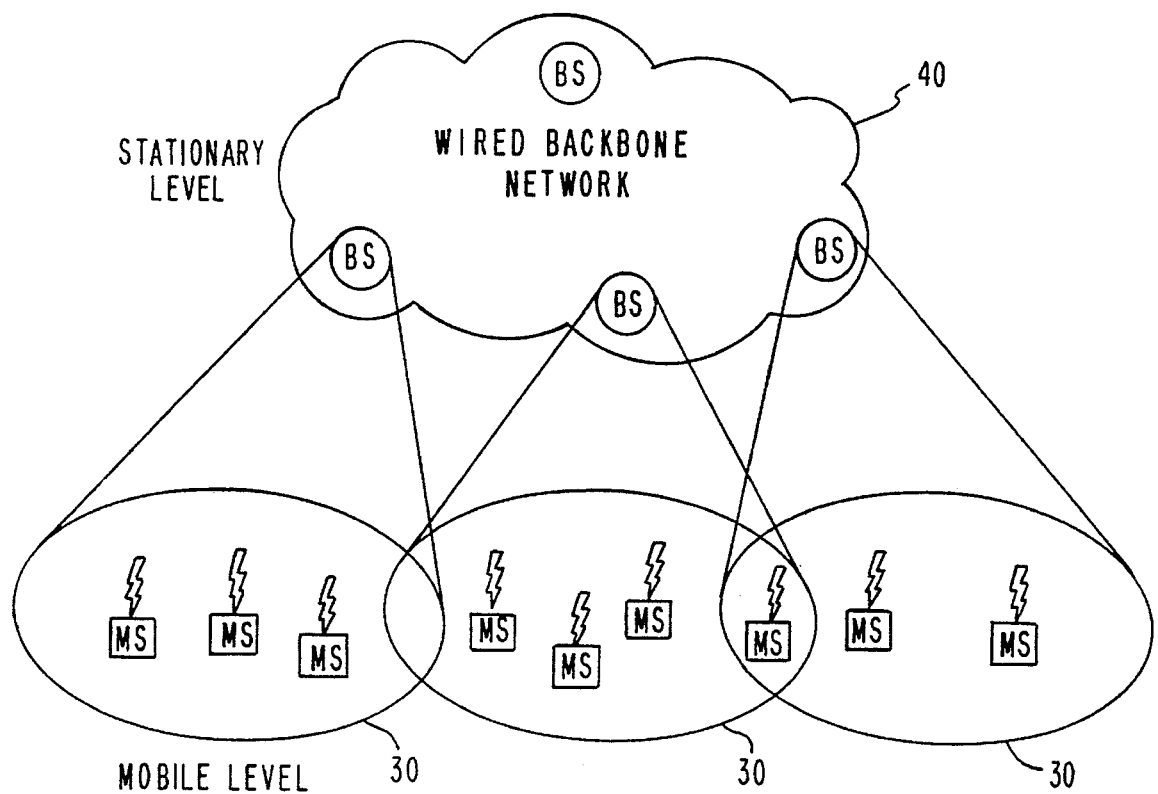
FIG. 1 is a schematic illustration of the overall environment in which the invention is implemented.

Shown in FIG. 1 is the overall environment in which the invention is implemented. Shown are the backbone network 40, the base stations B.S., the main stations M.S., and cells 30.

The communication bandwidth is divided into a number of non-interfering channels $f_1$, $f_2$, $f_k$. Some methods of achieving this are: (i) allocating disjoint frequency bands to each channel (FDMA), or (ii) using spread spectrum techniques such as those allowed by the FCC part 15 rules for the ISM bands. Cells that are allocated the same channel form a super-cell. Cells of a super-cell need not be geographically adjacent to each other. Super-cells are formed using two criteria: (i) maximize the system communication throughput, and (ii) minimize the complexity of the intercell scheduling in each super-cell.

Figure 2:
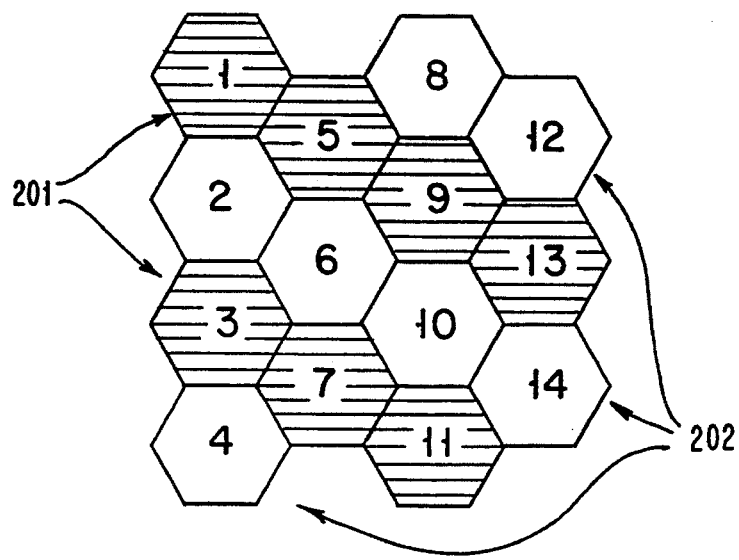
FIG. 2 is a schematic illustration of fourteen cells divided into two super-cells or groups.

An example of super-cell formation is shown in FIG. 2. There are fourteen cells, numbered from one to fourteen. The total spectrum is divided, for example, into two communication channels. These channels are allocated to the cells by forming two super-cells as follows, and allocating one of the channels to each super-cell. The first super-cell consists of the shaded cells 201 in FIG. 2 and the second super-cell consists of the unshaded 202 cells in FIG. 2. The first super-cell, referred to as super-cell 1 in FIG. 3, consists of cells 1,3,5,7,9,11,13 and the second super-cell, referred to as super-cell 2 in FIG. 3, consists of cells 2,4,6,8,10,12,14. These super-cells were obtained using the algorithm below with channels $f_1$ and $f_2$.

Following is the description of a simple scheme to allocate the channels to form super-cells. The motivation behind this scheme is to create super-cells which have minimal interference amongst the cells belonging to one super-cell. Denote the cells of the network by $C_1, C_2, \ldots, C_n$. Two cells are said to be neighbors if the geographical area of their coverage is overlapping. Start the channel allocation by allocating a channel to $C_1$. Then, allocate channels to $C_2, C_3, \ldots, C_n$ in order, according to the following rule. Allocate to $C_1$ the channel which is least used amongst $C_i$'s neighbors which have already been allocated a channel. This scheme is summarized in the following algorithm. Let $f_1, \ldots, f_k$ be the available channels.

```
do for i = 1,2, ... , n
    A_i(f_j): = the number of times channel j has been allocated
        amongst the neighbors of C_i;
    j: = the index s.t. A_i(f_j) = min_l{A_i(f_l)};
    Allocate to C_i the channel f_j;
end do;
```

Cells that are allocated the same channel form a super-cell. For example, all the cells allocated channel $f_1$ form one super-cell.

Inter-Cell Tier within a Super-Cell

Figure 3:
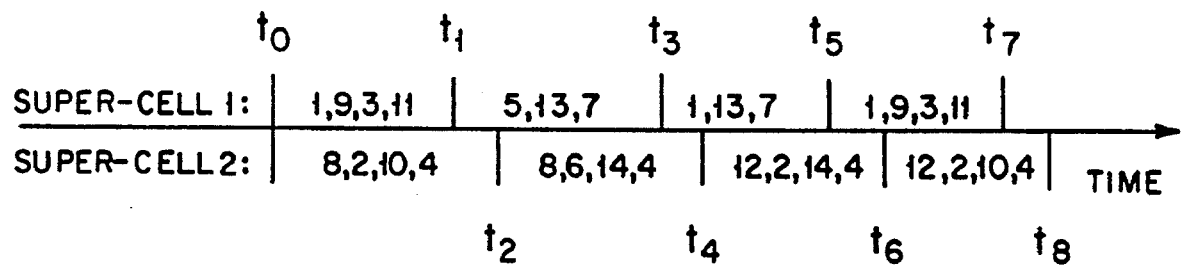
FIG. 3 schematically illustrates the allocation of the bandwidth of the channel of super-cell 1 to the cells in super-cell 1 and the bandwidth of the channel for super-cell 2 to the cells in super-cell 2.

Within each super-cell, different sets of time periods or frames are assigned to different cells. FIG. 3 shows an example of frame allocation amongst the cells of FIG. 2. The horizontal axis denotes time, which is divided into frames by the time markers $t_0, t_1, \ldots, t_8$ The numbers on the axis denotes cells, the users and base stations of which can activate their transceivers, during the corresponding time periods. Cells that are neither neighbors nor in the same super-cell can be scheduled to be active at the same time. For example, transceivers belonging to Cells 1,3,9, and 11, all of which belong to the first super-cell of FIG. 2, are simultaneously active from $t_0$ to $t_1$. Transceivers belonging to Cells 2,4,8, and 10, all of which belong to the second super-cell of FIG. 2, are simultaneously active from $t_0$ to $t_2$.

The allocation of frames to the cells is done by a scheduling algorithm. We propose two scheduling algorithms: distributed and centralized. Both algorithms are demand driven—the length of each frame allocated to a cell depends upon the requests of the users in that cell. These requests are collected by the base station as described in the sequel, and as shown in 506 of FIG. 5. The distributed algorithm requires no synchronization among the base stations (i.e., each base station has a local, independent clock), but requires exchange of control messages between neighboring base stations. The centralized algorithm avoids the need for communication among neighboring base stations, but requires synchronization among all base stations of the network (i.e., that all base stations be driven by a common clock).

Distributed Algorithm:

The distributed algorithm is based on the algorithm described in [2], which is incorporated by reference, for the dining philosophers problem. The following is an informal description of the algorithm. Associated with each pair of neighboring base stations $BS_i$ and $BS_j$, there is a token $T(ij)$.

At any time instant during the run of the algorithm, either $BS_i$ or $BS_j$ holds the token $T(ij)$. In order to get an allocation, base station $BS_i$ must hold all the tokens associated with it, that is, all tokens $T(i,k)$ where $BS_k$ is a neighbor of $BS_i$. This ensures that no two overlapping cells in the network get an allocation at the same time. To determine the initial distribution of the tokens, each base station $BS_i$ is assigned with a natural number Color(i), such that if $BS_i$ and $BS_j$ are neighbors then Color(i)≠Color(j). This assignment is referred to as coloring. The simplest coloring is obtained by assigning Color(i)=i. More efficient coloring (i.e., that require fewer colors) may be obtained by using well-known methods from the literature.

Initially, each token $T(ij)$ is at the base station whose coloring number is lower, i.e., at $BS_i$ if Color(i)>Color(j) or at $BS_j$ if Color(j)<Color(i). It can be shown that this initial distribution of the tokens ensures that there exists a non-empty set of base stations such that each base station in this set holds all the tokens associated with it. Thus, all base stations in this set gets an allocation. The scheduling algorithm proceeds by letting each base station whose allocation has terminated, send each token associated with it to the corresponding neighbor. The allocation of each base station starts when the base station has received all the tokens associated with it. The length of the time frame allocated to each base station is determined by the base station itself, depending on the amount of traffic in its cell (see below). This length is always between pre-specified minimum and maximum lengths. This guarantees the liveliness and fairness of the algorithm. More specifically, denote M as the maximum length allowed for a single allocation, and Δ as the maximum number of neighbors that any base station has. Then, each base station is guaranteed to get at least one allocation in every window of length MΔ. Moreover, every base station gets an allocation before any of its neighbors gets a second allocation.

A formal description of the distributed algorithm is as follows. Each base station maintains a local counter C which represents the current number of tokens that the base station holds. The steps performed by $BS_i$ are as follows.

```
initialize variables
    C: = number of tokens that base station BS_i initially holds;
    K: = number of neighbors of base station BS_i;
do forever
    while C < K do
        upon receiving a token do C: = C + 1;
    end while;
    execute all intracell wireless transmissions scheduled for
    current frame;
    send a token to each one of the K neighbors;
    C: = 0;
end do;
```

Centralized Algorithm:

The centralized algorithm may be described as follows. First, each base station $BS_i$ is assigned with a fixed number $B_i$, which represents the length of each frame allocated to this base station. Next, a sequence of allocations is computed (e.g., by the network control), such that during this sequence each base station $BS_i$ is given at least one allocation of length $B_i$. We refer to this sequence of allocations as a super-frame, and denote the length of the super-frame by T. Let $L_i$ be the number of times base station $BS_i$ gets an allocation during the super-frame. Each base station is provided with the parameter T, as well as with the time instants $t_i(1), t_i(2), \ldots t_i(L_i)$ at which the allocations for this base station start during a super-frame that starts at t=0. The centralized algorithm operates by consecutively repeating these super-frames. That is, base station $BS_i$ gets allocations of lengths $B_i$ starting at the times $mT+t_i(l)$ for all m=0, 1, 2, ... and $1 \leq l \leq L_i$. As the demands of the network change over time, a new super-frame may be computed every N super-frames, where $N \geq 1$ is determined according to the parameters of the network.

We now give an informal description of the procedure for computing the super-frame. This procedure is based on the distributed algorithm described previously in the following way. First, we fix a coloring for the network. Then, the distributed algorithm is executed from t=0 until the time instant t=T, at which each base station $BS_i$ has received at least one allocation of length $B_i$. The sequence of allocations thus obtained defines the super-frame. Clearly, a desired property is that the length T of the super-frame be minimal. This length is uniquely determined by the coloring. For simple network topologies, the optimal coloring in the sense of minimizing T may be obtained by an exhaustive search over all possible colorings. A simple way to determine T directly from a given coloring is as follows. Consider the directed graph in which vertex i has weight $B_i$, and there is an edge directed from vertex i to vertex j if and only if $BS_i$ and $BS_j$ are neighbors and Color(j)<Color(i). Then it can be shown that T is the longest directed path in this graph, where the length of a path is the sum of the weights of the vertices along the path.

Figure 4:
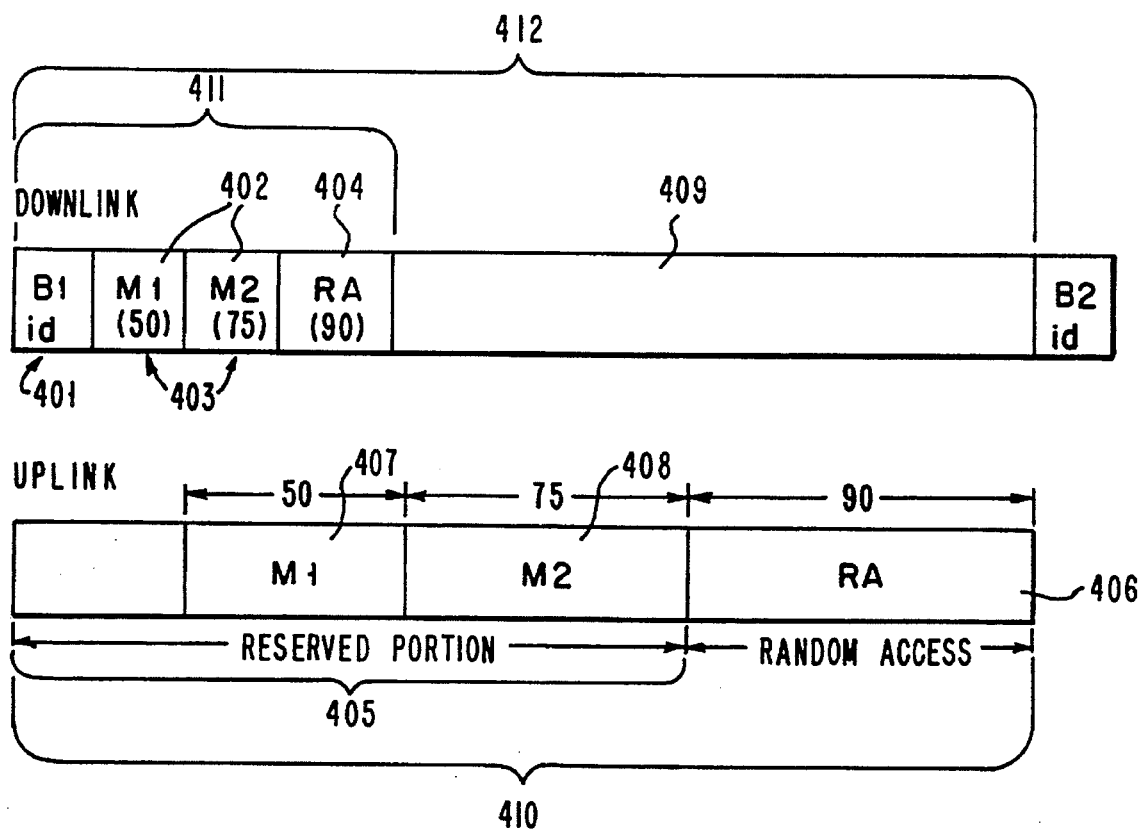
FIG. 4 schematically illustrates the upline and downlink channels between the base and mobile stations.

The following is a formal description of the procedure for computing the super-frame. This algorithm uses the following variables. The variable S(i) keeps track of the set of time instants at which the allocations for $BS_i$ start during the super-frame. Initially it is an empty set, and at the end of the procedure it is the set of the time instants $t_i(1), t_i(2), \ldots, t_i(L_i)$. The variable f is a two dimensional array. Each entry f(i,t) denotes the number of tokens that base stations $BS_i$ holds at time t. The variable A is a two dimensional array. Each entry A(i,t) denotes the number of tokens that are received by base station $BS_i$ at time t.

station sends on the wireless downlink channel a start message 502. Each start message contains the following information as shown in FIG. 4:

1. The identity of the base station 401.
2. The identities of the mobile users that will transmit next 402.
3. The time allocated for downlink transmissions 403.
4. The number of slots allocated for reservations 404.

Thereafter, the polled users start to transmit on the reserved portion 405 uplink channel 410, according to the order determined by the start message 411. The lengths 407 and 408 of the time periods allocated to the mobile users M1 and M2 respectively can be either fixed or variable. In the latter case the lengths are indicated in the start message 411. At the end of the transmissions of the polled users (or at the same time if simultaneous transmissions on the uplink and the downlink channels are allowed), the base station transmits messages awaiting to be transmitted on the data portion 409 downlink channel 412 (including paging messages). The data transmitted and acknowledgement on the uplink and downlink channels are shown in 503 of FIG. 5.

The uplink channel is divided into two portions; a random access portion 406 and a reserved portion 405. When a mobile station is turned on or enters a new cell, it listens to the base station identity 401 and waits for the random access portion 406 of the channel for making its reservation requests 504. A request message contains the length of the requested allocation (not needed if all allocations have the same fixed length). For example, a mobile station may request two slots of 1000 bits each on a 1 Mbps channel for total of 2 milleseconds. Collisions among request messages are resolved by a random access algorithm [1,5], which are hereby incorporated by reference. Thus, neither the number nor the identities of the mobile users currently in the cell need to be known to the base station. During the reservation period on the uplink channel, the downlink channel is used either for ACKs or for carrier sense purpose. Collisions that were not resolved during this period of reservations, continue to be resolved during the next frame allocated to this base station. The random access portion is used for transmission of control messages (reservation requests) as well as short data transmissions that do not require explicit reser-

---

```
for all i do (S(i): = Φ
for i and t do A ≡ 0;
for i: = 1 to n do f(i,0): = number of tokens that base station Bs_i initially holds;
for i: = 1 to n do K(i): = number of neighbors of base station BS_i;
t: = 1;
while there exists i s.t. S(i) is empty do
    for i: = 1 to n do f(i,t): = f(i,t − 1) + A(i,t);
    for all i s.t. f(i,t): = K(i) do
        f(i,t): = 0;
        S(i): = S(i) ∪ {t};
        for each neighbor j of i do A(j,t + B_i): = A(j,t + B_i) + 1;
    end for;
    t: = t + 1;
end while;
T: = t;
```

---

Collecting Users Demands and Allocating Bandwidth to Cells

Figure 5:
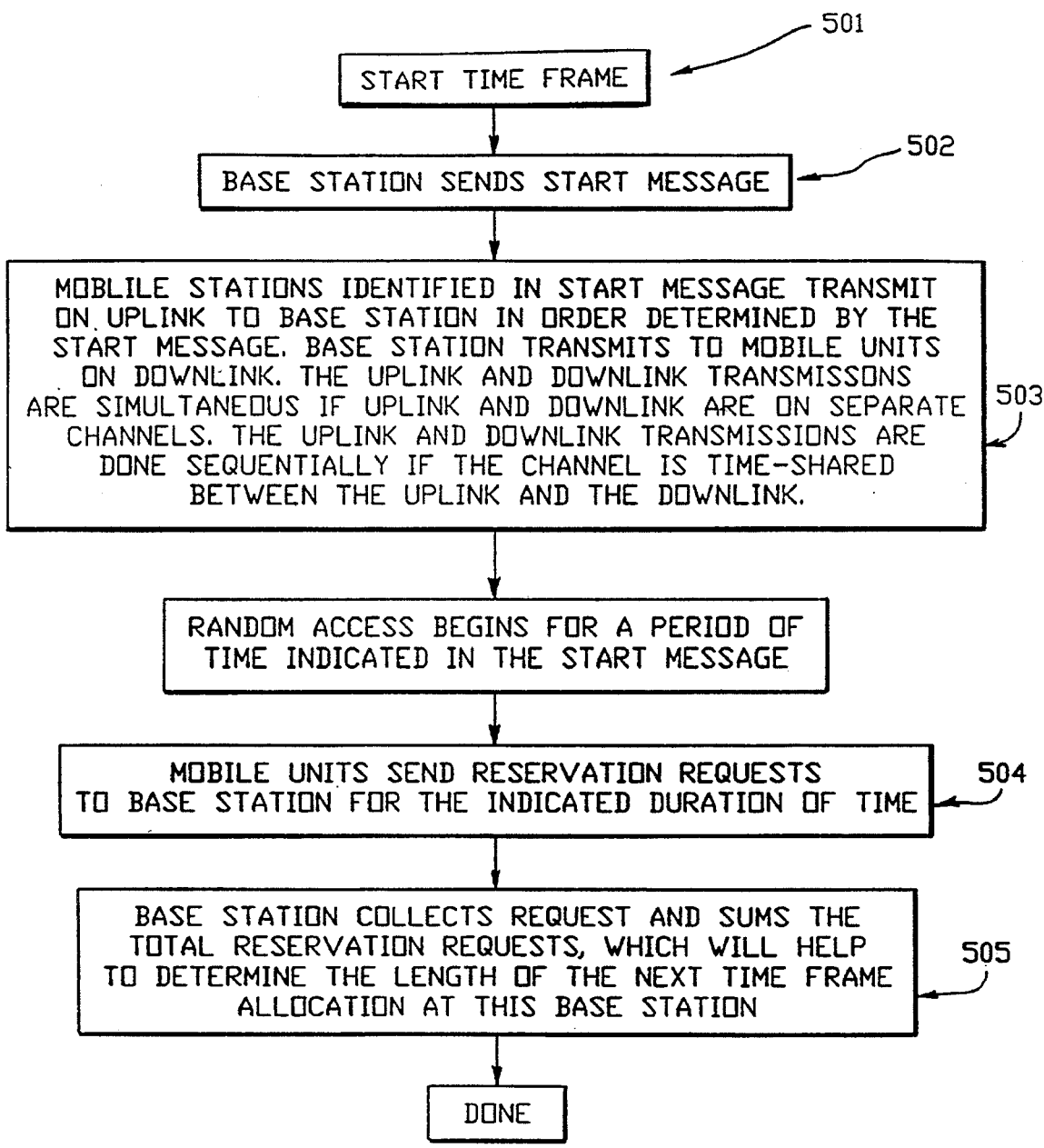
FIG. 5 is flow diagram illustrating the collection of user demands and the allocation of bandwidth to cells in a super-group.

A flow diagram is shown in FIG. 5. At the beginning of each time frame 501 allocated to a base station, the base vation. The reserved portion of the channel is used for transmission of relatively long or continuous data streams. A mobile station (M.S.) with an allocated reserved channel transmits its control messages in its reserved channel. This way, the random access channel is left available for the stations with new reservation requests.

The base station determines the length of the next frame allocated to it by the scheduling algorithm described previously as follows. The length of the reserved portion of the next frame is determined by the base station according to the successful reservations in the current frame 505. The length of the random access portion of the next frame is determined according to the load experienced during the random access portion of the current frame (and is never less than a pre-specified minimum length). For example, it can be a function of the number of collision slots and idle slots observed during the current random access portion.

Any microprocessor, such as AT&T's Hobbit, may be used to implement this invention in the mobile and base stations of the cellular network.

[1] U.S. Pat. No. 5,123,029 to D. Bantz et al., "Broadcast-Initiated Biprtite Frame MultiAccess Protocol," issued on Jun. 16, 1992.

[2] K. M. Chandy and J. Misra, "The Drinking Philosophers Problem," ACM Trans. Program. Lang. and System, vol. 6, no. 4, pp. 632–646, October 1984.

[3] W. C. Y. Lee, "Mobile Cellular Telecommunications Systems," McGraw Hill, 1989.

[4] U.S. Pat. No. 5,210,753, issue date May 11, 1993, to K. S. Natarajan, "Robust Scheduling Mechanisms for Efficient Bandwidth,"

[5] R. Rom and M. Sidi, "Multiple Access Protocols, Performance and Analysis," Springer Verlag, 1990.

[6] R. Steele, Mobile Radio Communications, 1992.

[7] B. Tuch, "An ISM Spread Spectrum Local Area Network: WaveLAN," Proceedings of IEEE Workshop on Wireless LANs, May 1991.

Having thus described our invention, what we claim as new and desire to secure by Letters Patents is:

1. A method of allocating overall communications bandwidth in two tiers of allocation to cells in a cellular network for transmitting bursty data to and from mobile units, comprising the steps of:

a. partitioning overall communications bandwidth into a plurality of distinct channels, each said distinct channel having sufficient bandwidth to handle bursty data to and from a mobile unit;

b. forming a plurality of groups of said cells, said plurality of groups being equal in number to said plurality of distinct channels, by collecting into each said group a plurality of said cells selected so as to minimize interference between cells within each said group, at least one said group having some interference between cells therein, no two of said groups having the same one of said cells therein;

c. in a first tier of allocation, assigning a different one of said distinct channels to each said group; and d. in a second tier of allocation, for each said group, dynamically allocating bandwidth of said one distinct channel assigned to said group to said cells of said group in accordance with user demand in each cell of said group, said bandwidth of said one channel assigned to said at least one group being allocated in said second tier of allocation using time division multiple access (TDMA) scheduling with spatial reuse.

2. A method as recited in claim 1 wherein step (b) of claim 1 is performed by:

assigning one of said distinct channels to each said cell one cell at a time, each successive cell being assigned the channel that is least assigned to neighbors of said each successive cell that already have been assigned a channel, all cells assigned the same channel forming one of said plurality of groups.

3. A method as recited in claim 1, wherein in step (d) a superframe having a plurality of time slots is defined for said distinct channel assigned to said at least one group, and said bandwidth of said distinct channel is allocated in said second tier of allocation to each cell of said at least one group by dynamically allocating a number of said time slots to said each cell in accordance with user demand in said each cell.

4. An apparatus for allocating overall communications bandwidth in two tiers of allocation to cells in a cellular network for transmitting bursty data to and from mobile units, comprising:

means for partitioning overall communications bandwidth into a plurality of distinct channels, each said distinct channel having sufficient bandwidth to handle bursty data to and from a mobile unit;

means for forming a plurality of groups of said cells, said plurality of groups being equal in number to said plurality of distinct channels, each said group comprising a plurality of said cells selected so as to minimize interference between cells within each said group, at least one said group having some interference between cells therein, no two of said groups having the same one of said cells therein;

means for dividing overall communications bandwidth in a first tier of allocation by assigning a different one of said distinct channels to each said group; and means for dynamically allocating bandwidth of each said distinct channel in a second tier of allocation to said cells of said group to which said distinct channel is assigned in accordance with user demand in said cells of said group, said bandwidth of said distinct channel assigned to said at least one group being allocated in said second tier of allocation using time division multiple access (TDMA) scheduling with spatial reuse.

* * * * *